(12) United States Patent
Chen (10) Patent No.: US 8,251,183 B2
(45) Date of Patent: Aug. 28, 2012

(54) ELECTRICITY GENERATING DEVICE BY APPLYING VEHICLE WEIGHT

(76) Inventor: Ming-Cheng Chen, Shengang Township, Taichung County (TW)

( * ) Notice: Subject to any disclaimer, the term of this patent is extended or adjusted under 35 U.S.C. 154(b) by 1029 days.

(21) Appl. No.: 12/203,205

(22) Filed: Sep. 3, 2008

(65) Prior Publication Data

US 2010/0051389 A1    Mar. 4, 2010

(51) Int. Cl.
*H02P 9/04* (2006.01)
(52) U.S. Cl. .......................................... 185/39; 290/1 R
(58) Field of Classification Search .................... 185/27; 190/1 R; 310/15
See application file for complete search history.

(56) References Cited

U.S. PATENT DOCUMENTS

| | | | | |
|---|---|---|---|---|
| 1,916,873 A * | 7/1933 | Wiggins | | 185/39 |
| 4,238,687 A * | 12/1980 | Martinez | | 290/1 R |
| 6,494,144 B1 * | 12/2002 | Perez Sanchez | | 104/287 |
| 6,858,952 B2 * | 2/2005 | Gott et al. | | 290/1 R |
| 7,067,932 B1 * | 6/2006 | Ghassemi | | 290/1 R |
| 2006/0021835 A1 * | 2/2006 | Kimes et al. | | 192/46 |

* cited by examiner

*Primary Examiner* — William C Joyce
(74) *Attorney, Agent, or Firm* — Chun-Ming Shih (57) ABSTRACT

In an electricity generating device by applying vehicle weight, a rolling vehicle wheel is weighting down on a pressure receiver to actuate a driving mechanism having a restoring function. It is then able to provide a unidirectional rotating torque to drive a generating device to produce electrical power. The mechanical power transmission is performed by a transmission gear unit composed of a driving wheel and a follower wheel interconnected each other with a transmission means therebetween. When the vehicle weight is applied to the driving mechanism by pressing the vehicle wheel on the pressure receiver, the driving mechanism is forced to downwardly urge a ratchet wheel and a driving wheel to rotate that in turn causes the rotation of the follower wheel through the transmission means thereby driving the generating device to operate to produce electricity. The driving mechanism can recover its initial state with the aid of a balancing weight as soon as it has been liberate from the exerted pressure of the vehicle wheel. The device is to be installed flush with the road surface to work.

4 Claims, 8 Drawing Sheets

ELECTRICITY GENERATING DEVICE BY APPLYING VEHICLE WEIGHT

BACKGROUND OF THE INVENTION

1. Field of the Invention

The present invention relates to an electricity generating device by applying vehicle weight, and in particular, to a generating device when a rolling vehicle wheel is weighting down on a pressure receiver, a driving mechanism installed flush with the road surface is actuated to drive the electricity generating device to output the electric power.

2. Description of the Prior Art

Rising of the environmental consciousness to save energy and minimize carbon producing has become common all over the world. The technique of energy saving and development of various new electric generation means is a paramount importance to harbingers who are working in the front of scientific fields.

From the latter parts of the $20^{th}$ century up to now, the bulk power station plays the most essential roll on the power generation to provide all the power demand by the society. Meanwhile, the public power service including the traffic signs and the street and roadway lighting has been increasing not only in amount but also broadly spreading in large areas that becomes uneconomical to supply the power to aforesaid consumers from the bulk power station. And instead the power supply from local small-scaled power sources scattered here and there seems more economical and efficient for the sake of saving length of the distribution line.

In view of the foregoing situation, in a bid to solve the present problems, the inventor of the present invention herein has conducted intensive research based on a long time of experience in connection with the related techniques, with consistent experimentation and improvement finally has come out with the present invention.

SUMMARY OF THE INVENTION

It is an object of the present invention to provide electricity generating device wherein when a rolling vehicle wheel is weighting down on a driving mechanism to actuate it which in turn drives a generating device to output an electric power via a transmission gear.

It is another object of the present invention to provide aforesaid electricity generating device in which the mechanical power is converted into electric power by a transmission means.

It is still another object of the present invention to provide a plurality of aforesaid electricity generating device, which can be linked in cascade applicable for different road widths so as to effectively operate.

It is still another object of the present invention to provide aforesaid electricity generating device with compact size, which can be easily, installed flush with the road surface and efficiently workable with a prolonged lifespan.

Meanwhile, the electricity so produced is to be supplied to the electrical installation for public use such as the traffic signs, street and roadway lighting.

To achieve the above-mentioned objects, the present invention comprises essentially a driver, a balancing weight, a driving wheel, a ratchet wheel, a follower (driven) wheel, a transmission means and a generator.

A transmission gear unit is composed of the driving wheel and the follower wheel interconnected each other with the transmission means therebetween. The driving wheel is coupled with a ratchet wheel capable of making one-way circulation, and the driver is fixed to the driving wheel with a mandrel. The driver is further accompanied with a balancing weight. The generator is engaged to the extension shaft of the follower wheel to work. When the vehicle wheel is weighting down on the driver, the downwardly urged driver is then causing the ratchet wheel and the driving wheel to make one-way circulation and the follower wheel to make unidirectional rotation via transmission means so as to drive the generating device to work. The driver can return to its initial position with the aid of the balancing weight as soon as it has been liberated from the exertion of the vehicle wheel. The device of the present invention is to be installed flush with the road surface to work.

BRIEF DESCRIPTION OF THE DRAWINGS

Other objects and purposes of the invention will be apparent to persons acquainted with device of this general type upon reading the following specification and inspection of the accompanying drawings.

DETAILED DESCRIPTION OF THE PREFERRED EMBODIMENT

Figure 1:
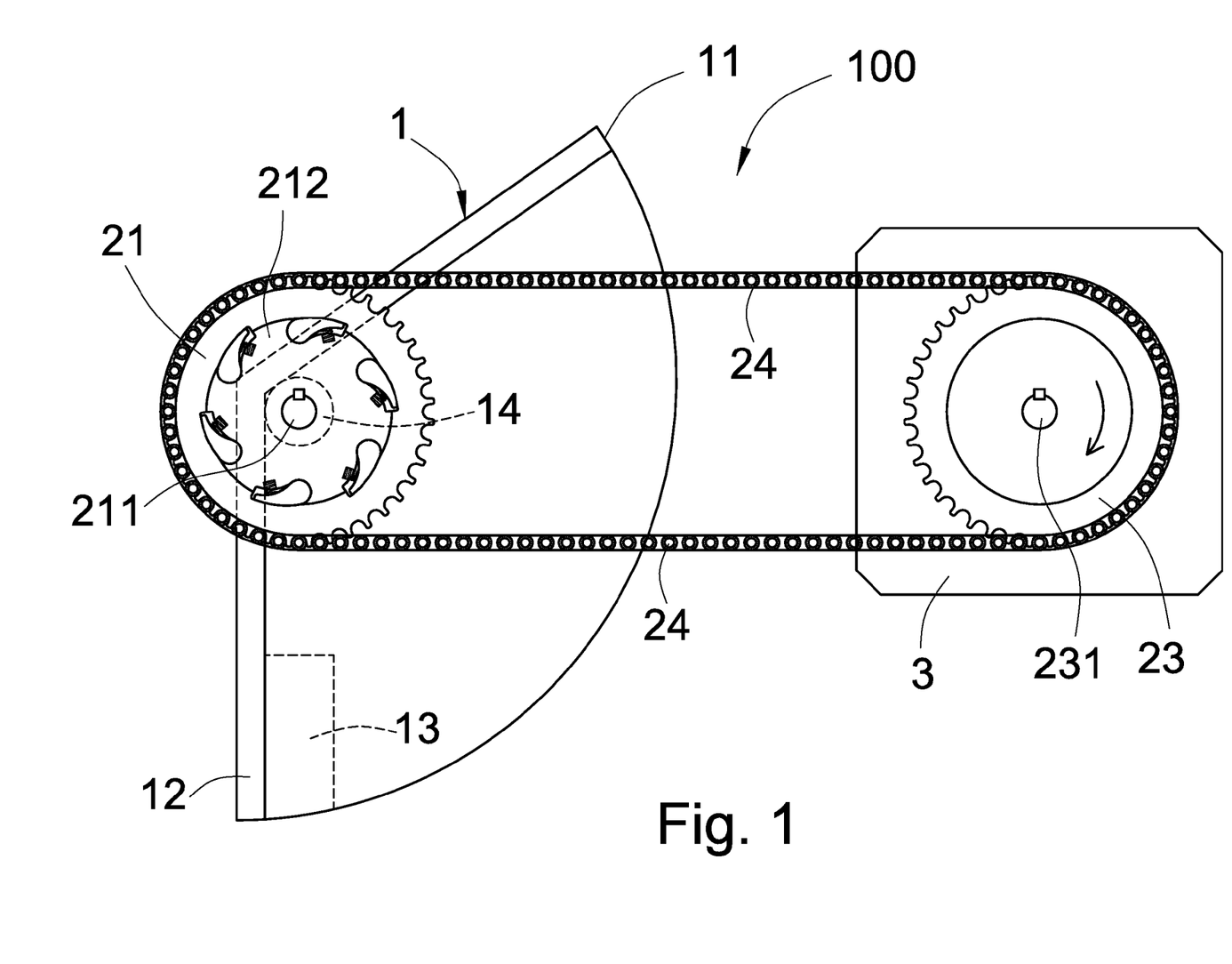
FIG. 1 is a schematic view of the present invention.

Referring to FIG. 1, the generating device 100 of the present invention includes a driver 1 which further includes a pressure receiver 11 and a restoring element 12 forming a predetermined angle therebetween. The pressure receiver 11 is located above the restoring element 12 and both are engaged each other with a hinge to the mandrel 211. The aforesaid angle formed between the pressure receiver 11 and the restoring element 12 is designed to have a value according to predetermined angular swinging speed of the driver 1. The restoring force of the restoring element 12 is offered by at least a balancing weight 13 whose weight is also determined according to the angular swinging speed of the driver 1. The hinge is enclosed by a sleeve 14, which is also enclosing the mandrel 211 of a driving wheel 21. The whole structure of the present invention is installed beneath the road flush with the road surface 300 except the pressure receiver 11 being emerged out the road surface 300.

Figure 2:
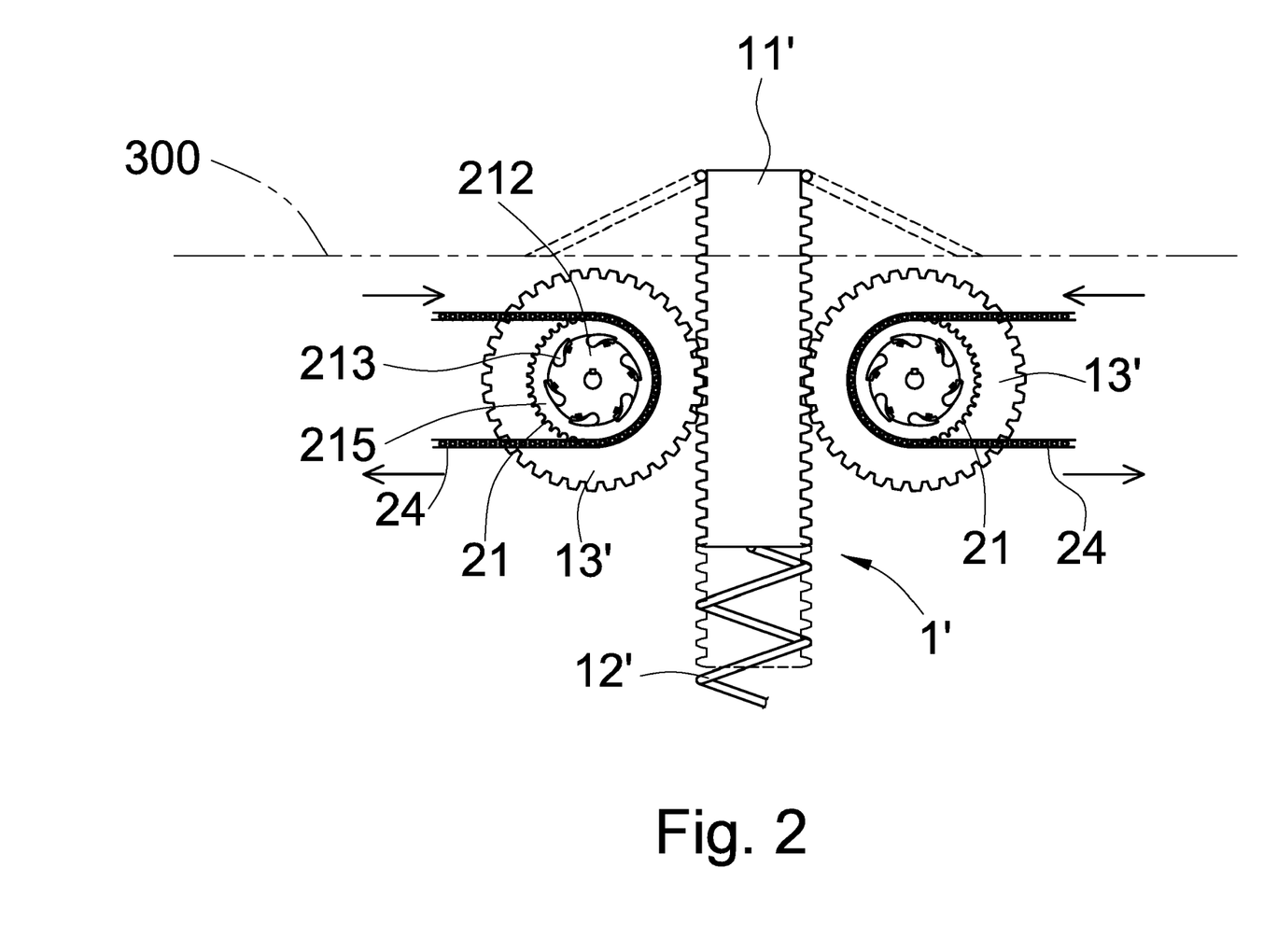
FIG. 2 is a schematic view in another embodiment of the present invention.

As shown in FIG. 2, in another embodiment of the present invention, the generating device includes a driver 1' which further includes a pressure receiver 11' and a restoring element 12', whereas the former is located above the latter. The pressure receiver 11' is an elongated strip shaped plate serrated along at least one edge, and the restoring element 12' is a spring, for example, a compressed spring, or a leaf spring with a restoring force to bring the pressure receiver 11' back to its initial position. The pressure receiver 11' is in mesh with an external gear wheel 13' which is engaged to the shaft 211 of a driving wheel 21 so as to convert the linear motion of the pressure receiver 11' into rotation of the external gear wheel 13'.

A transmission gear unit is composed of the driving wheel 21 and a follower wheel 23 either directly coupled together to transmit the mechanical power, or a transmission means 24 is interconnected therebetween to perform transmission of the mechanical power. In the present invention, a flexible chain is used as a transmission means 24, but not limited only as such.

Figure 3:
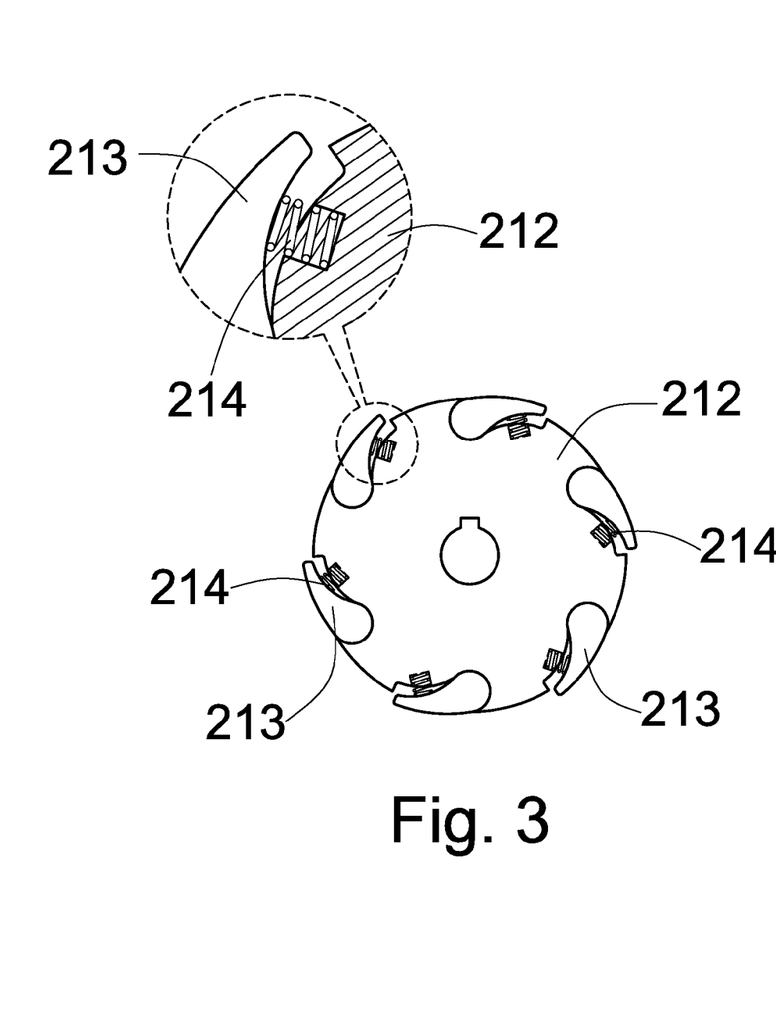
FIG. 3 is an illustrative view showing the ratchet, ratchet pawls and the elastic element.
Figure 4:
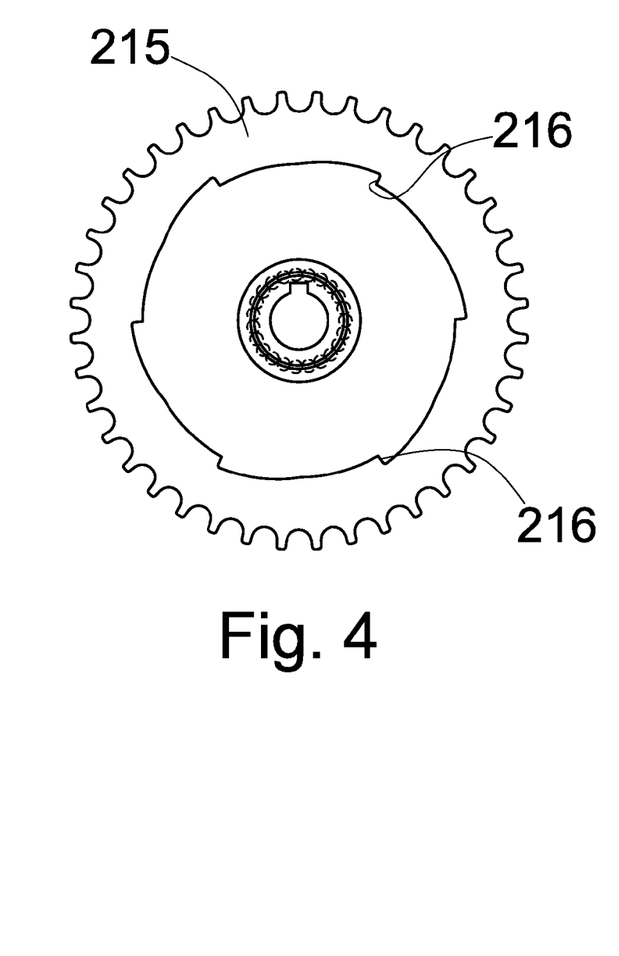
FIG. 4 is a schematic view of the external wheel of the driving wheel.

As shown in FIG. 3 and FIG. 4, the driving wheel 21 further comprises a ratchet wheel 212, several ratchet pawls 213 and an external wheel 215. The ratchet wheel 212 is engaged to the mandrel 211 with more than one ratchet pawls 213 distributed around its rim. An elastic element 214 is interposed between the ratchet pawl 213 and the ratchet 212 serving as a cushion. The external wheel 215 is rotatably sleeved on the mandrel 211 and has several detents 216 formed along the inner circumference thereof so as to fix the ratchet wheel 212 onto the mandrel 211 and to be in mesh with the ratchet pawls 213. By this scheme, when the external wheel 215 makes a continuous reciprocation, the ratchet wheel 212 is driven to make a unidirectional rotation (circulation).

In the case the driver 1 (or an external wheel 13') is engaged on the mandrel 211 of the driving wheel 21 to rotate, the driving wheel 21 can only rotate in one direction because its mandrel 211 is also conjoined to the ratchet wheel 212, accordingly the unidirectional rotation of the driving wheel 21 is transmitted to an extension shaft 231 of the follower wheel 23 via transmission means 24.

Figure 8:
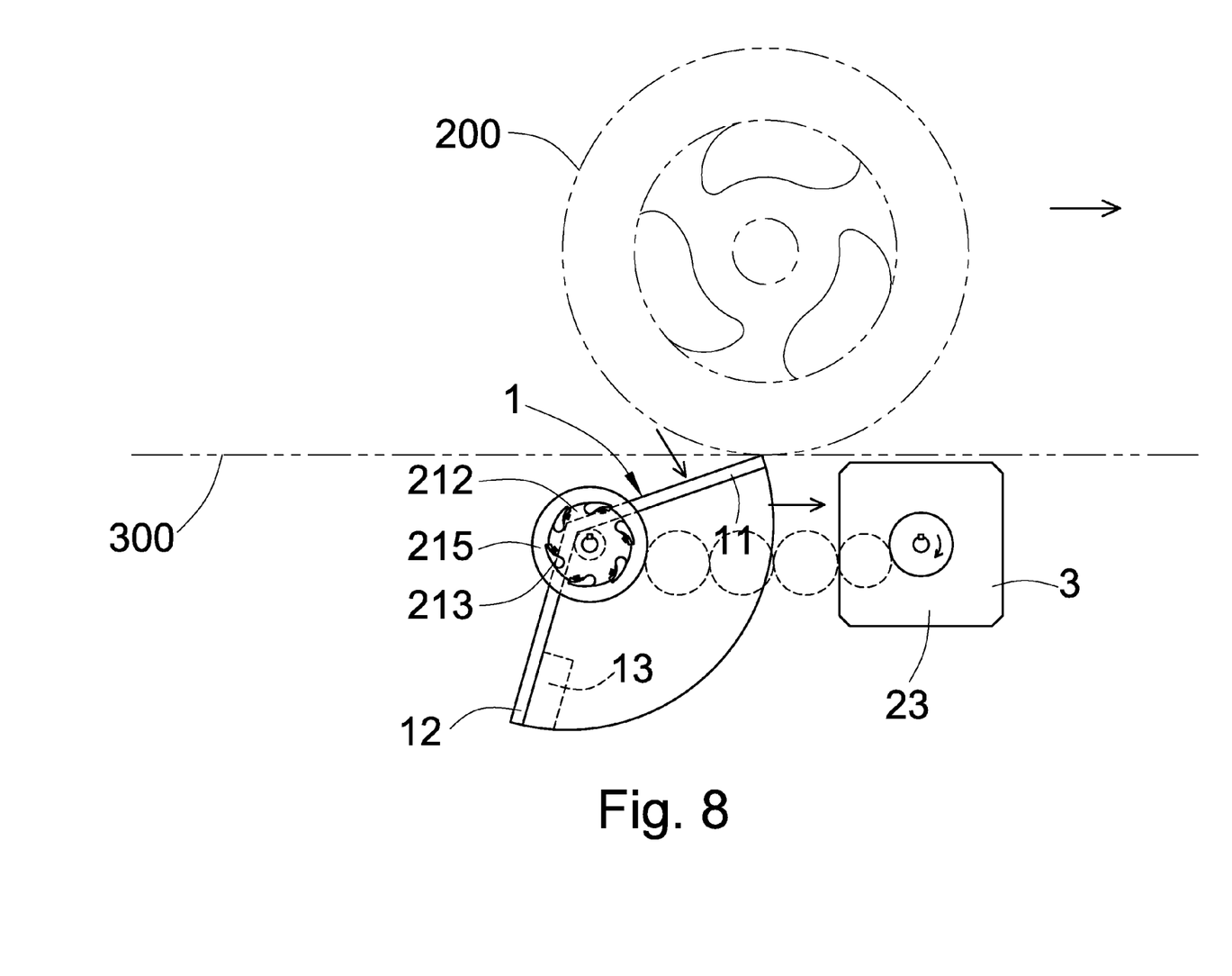
FIG. 8 is a schematic view showing another aspect of the power transmission by the transmission means.

Referring to FIG. 8, the transmission means 24 may select one of the transmission ways from variable speed transmission, belt drive, chain drive, worm gearing, friction drive and transmission gearing.

A generator 3 is engaged with an extension shaft 231 of the follower wheel 23 to be driven by the follower wheel 23 to output the electrical power.

Figure 5:
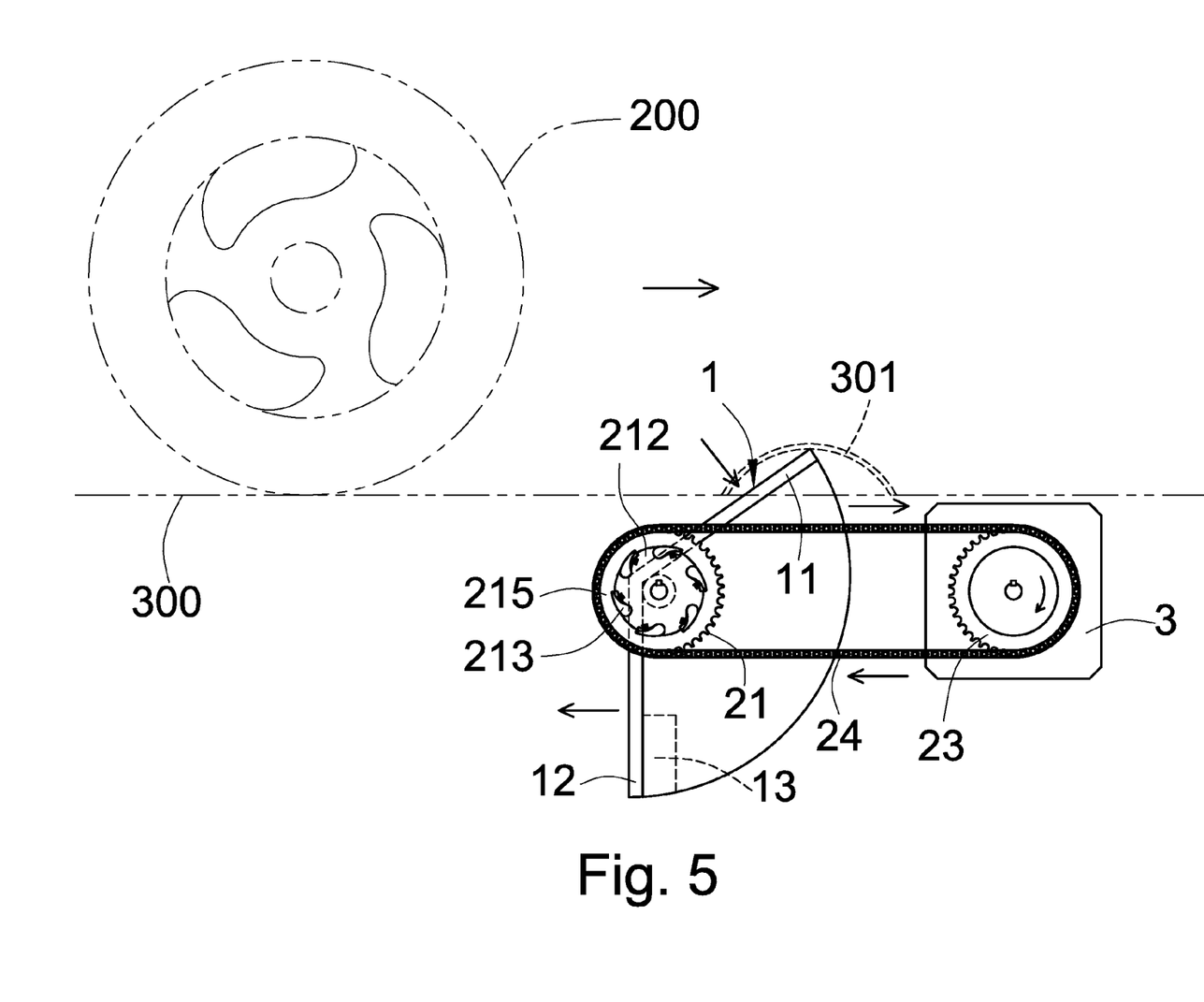
FIG. 5 through FIG. 7 are schematic views illustrating the operation of the present invention.
Figure 6:
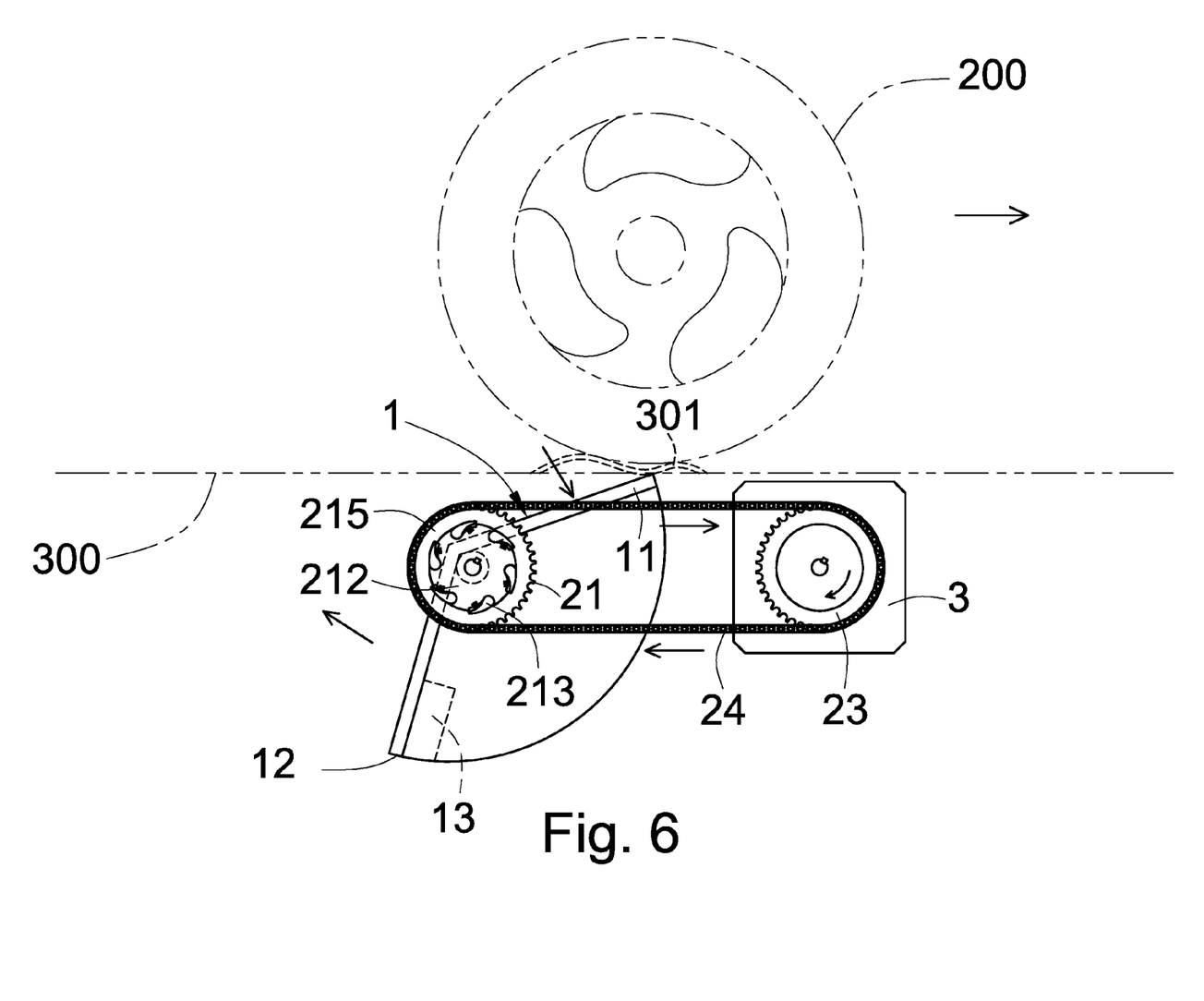
Figure 7:
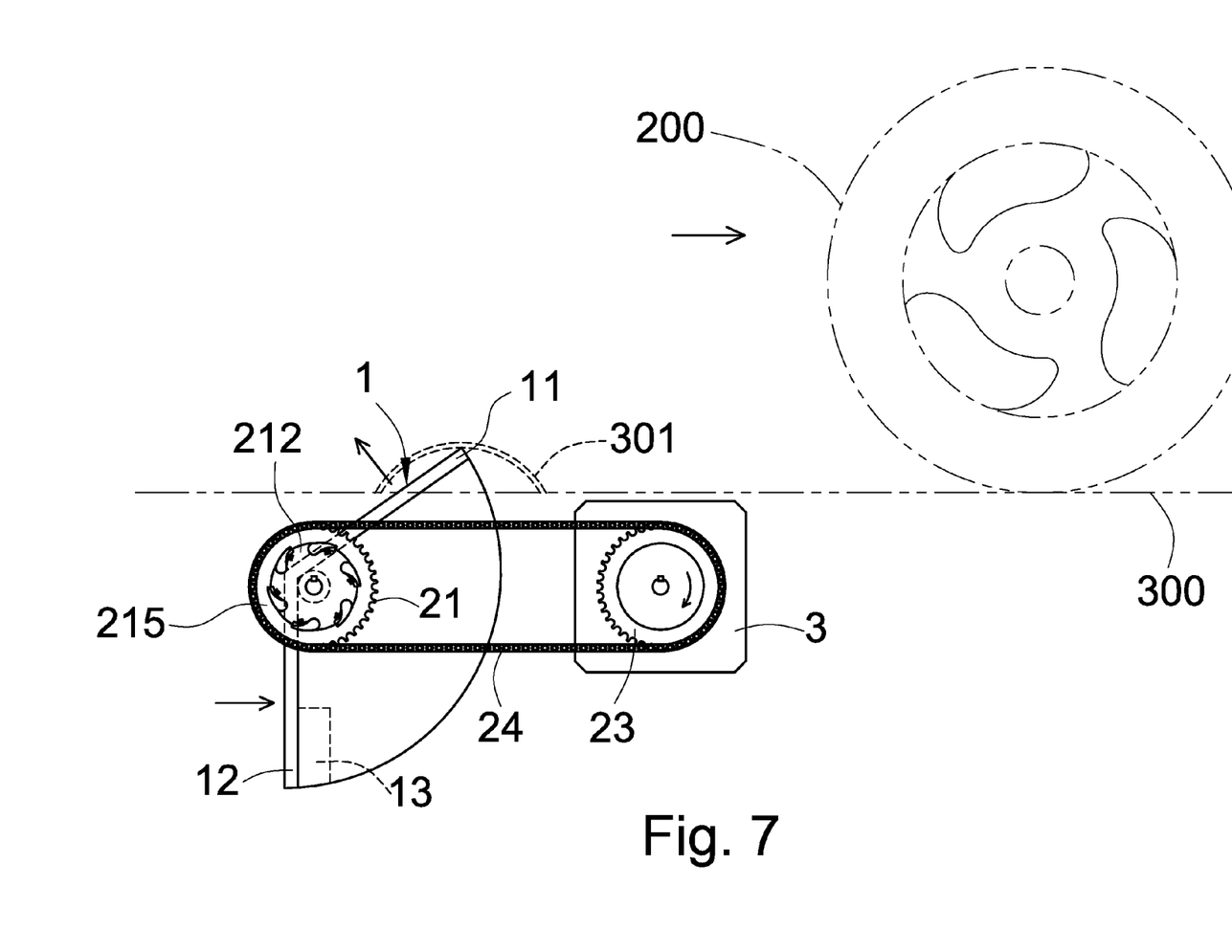

Referring to FIG. 5 through FIG. 7, when operating the generating device of the present invention, at least a speed reducer 301 can be added if necessary. Referring to FIG. 5, before being urged by the vehicle wheel 200, the pressure receiver 11 or 11' is emerged out of the road surface 300 supported by the restoring force of the restoring element 12 or 12'. Referring to FIG. 6, as soon as the vehicle wheel 200 has trodden on the driver 1 or 1' and exerted the vehicle weight on the pressure receiver 11 or 11', it will downwardly urge the ratchet wheel 212 and driving wheel 21 to rotate such that the follower wheel 23 is simultaneously driven by the transmission means 24 and finally the generator 3 is driven to produce the electricity.

Referring to FIG. 7, as soon as the vehicle wheel 200 has liberated the driver 1 or 1', the pressure receiver 11 or 11' returns to its initial position with the aid of the balancing weight 13 and restoring force of the restoring element 12 or 12'. Again the next vehicle wheel 200 treads on and goes away from the pressure receiver 11 or 11', the driving mechanism is able to keep working that causes the generator 3 to continuously output the electric power.

Figure 9:
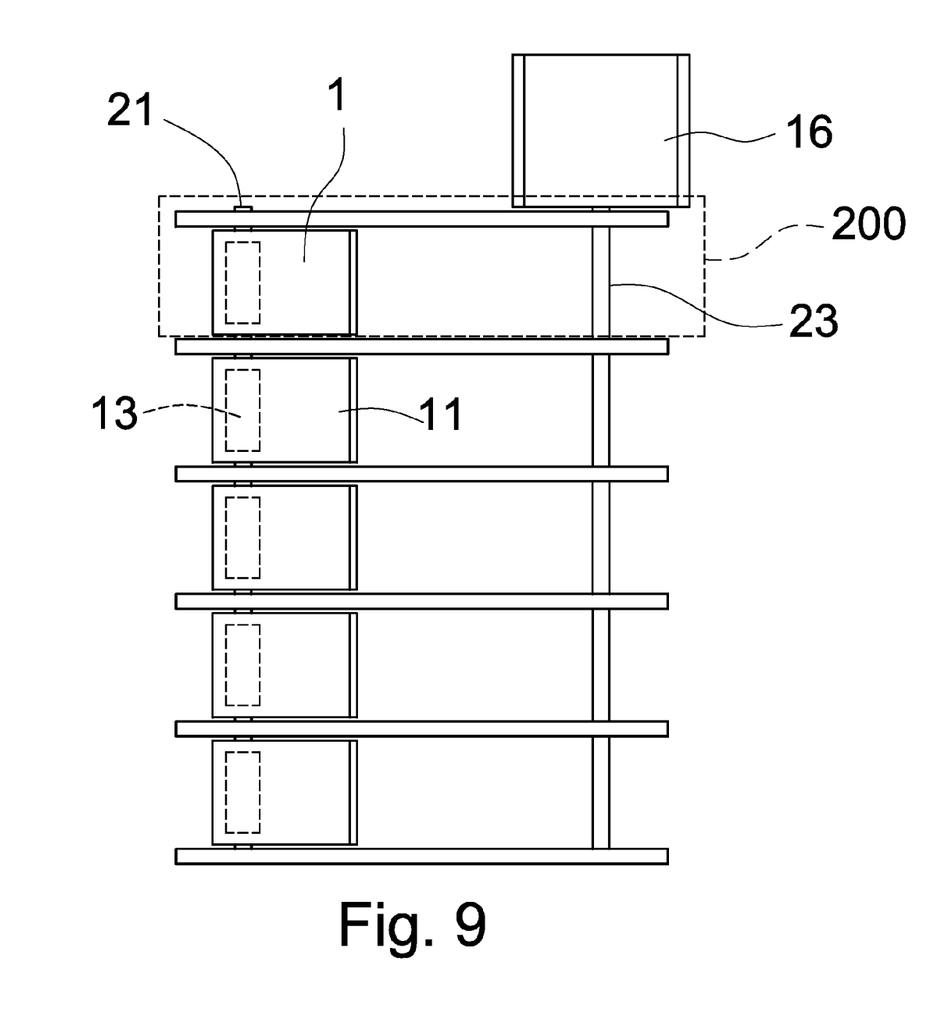
FIG. 9 is schematic view wherein a plurality of generating devices of the present invention are linked in cascade.

Referring to FIG. 9, wherein a plurality of generating devices 100 are linked in cascade by connecting the individual mandrels 211 and the extension shafts 231 so as to be applicable to various different road widths.

The advantages of the generating device of the present invention are:
1. The generating device is installed flush with the road surfaces only emerging out of the driver that never causes the traffic interference.
2. The electric power produced can be supplied to local public demand such as the traffic signs and the street and roadway lighting.
3. A plurality of generating devices can be joined in cascade to meet the requirement of different road widths.
4. The structure of the generating device is compact, small sized, easy to install, and operative with high efficiency and prolonged life.

It is apparent to a person skilled in the art that the basic idea of the invention can be implemented in many different ways. The invention and its embodiments are thus not restricted to the examples given above, but may vary with the scope of the following claims.

What is claimed is:

1. An electricity generating device by applying vehicle weight, utilizing a driver with restoring force, said driver comprising a pressure receiver and a restoring weight element hinged together onto a mandrel and forming a predetermined angle therebetween, wherein said angle formed between said pressure receiver and said restoring element is designed to have a value according to predetermined angular swinging speed of said driver, and said driver is able to provide a continuous unidirectional rotating torque to drive a generator to output electrical energy when being exerted a vehicle weight, and wherein a transmission gear unit is employed to provide said device with the continuous unidirectional rotating torque, said device further comprises a driving wheel and a follower wheel, the mechanical power output of said driving wheel is transmitted to said follower wheel, said driving wheel is composed of a ratchet wheel, several ratchet pawls and an external wheel, said ratchet wheel is engaged to said mandrel with more than one ratchet pawls distributed around its rim, an elastic element is interposed between each said ratchet pawl and said ratchet wheel serving as a cushion, said external wheel is rotatably sleeved on said mandrel and having several detents formed along the inner circumference thereof, and said detents are to be in mesh with said ratchet pawls.

2. The generating device of claim 1, wherein said transmission gear unit further employs a transmission means to transmit the mechanical output of said driving wheel to said follower wheel.

3. The generating device of claim 2, wherein said transmission means may select one of the transmission ways from variable speed transmission, belt drive, chain drive, worm gearing, friction drive, and transmission gearing.

4. The generating device of claim 1, wherein said follower wheel is engaged with said generator, and said driving wheel is engaged with said ratchet wheel so as to control said driving wheel to make only unidirectional rotation to drive said follower wheel thereby driving said generator to output electricity.

* * * * *